United States Patent [19]
Krössmann et al.

[11] Patent Number: 5,429,227
[45] Date of Patent: Jul. 4, 1995

[54] CHAIN CONVEYOR

[75] Inventors: Jürgen Krössmann, Schwerin; Peter Golz, Seevetal; Andreas Rinke, Bad Oldesloe; Martina Dürig, Wentorf, all of Germany

[73] Assignee: Körber AG, Hamburg, Germany

[21] Appl. No.: 270,049

[22] Filed: Jul. 1, 1994

[30] Foreign Application Priority Data

Jul. 19, 1993 [DE] Germany .................. 43 24 120.4

[51] Int. Cl.⁶ ............................................. B65G 17/06
[52] U.S. Cl. ....................................................... 198/852
[58] Field of Search ............................... 198/850, 852

[56] References Cited

U.S. PATENT DOCUMENTS

| | | | |
|---|---|---|---|
| 2,298,386 | 10/1942 | Jennings | 198/852 |
| 2,463,970 | 3/1949 | Hunnicutt | 198/852 |
| 3,450,250 | 6/1969 | Frisk | |
| 3,575,282 | 4/1971 | Gaiotto et al. | |
| 3,952,860 | 4/1976 | Specht | 198/852 X |
| 4,290,762 | 9/1981 | Lapeyre | 198/852 X |
| 4,555,014 | 11/1985 | Krempa | 198/852 |
| 4,597,492 | 7/1986 | Lachonius et al. | |
| 4,664,253 | 5/1987 | Fahrion | |
| 4,893,709 | 1/1990 | Schroeder et al. | 198/852 |
| 5,076,422 | 12/1991 | Clopton | 198/852 X |
| 5,127,515 | 7/1992 | Damkjaer | 198/852 X |
| 5,307,923 | 5/1994 | Damkjaer | 198/852 |

FOREIGN PATENT DOCUMENTS

| | | |
|---|---|---|
| 0221683B1 | 12/1991 | European Pat. Off. . |
| 2583024 | 12/1986 | France . |
| 1005453 | 5/1957 | Germany . |
| 2822196 | 11/1979 | Germany . |
| 3235224A1 | 4/1983 | Germany . |
| 0897549 | 5/1962 | United Kingdom ....... 198/852 |
| 385426 | 5/1973 | U.S.S.R. . |

*Primary Examiner*—James R. Bidwell
*Attorney, Agent, or Firm*—Darby & Darby

[57] ABSTRACT

A chain conveyor for the transport of mass flows of cigarettes or other rod-shaped commodities has a series of identical links which are articulately connected to each other by alternating vertical and horizontal chain pins. The upper portions of the vertical pins carry platforms having supporting surfaces for the commodities, and each vertical pin further carries roller followers serving to track vertically spaced-apart portions of a guide surface which can have one or more non-linear portions, such as convex portions. The leading and trailing portions of successive platforms are interdigitated in such a way that the supporting surfaces of neighboring platforms can be inclined relative to each other as well as that the supporting surfaces of neighboring platforms can turn relative to each other about the axes of the respective vertical pins. Portions of the horizontal pins can extend into a channel between the vertically spaced-apart portions of the guide surface.

20 Claims, 5 Drawing Sheets

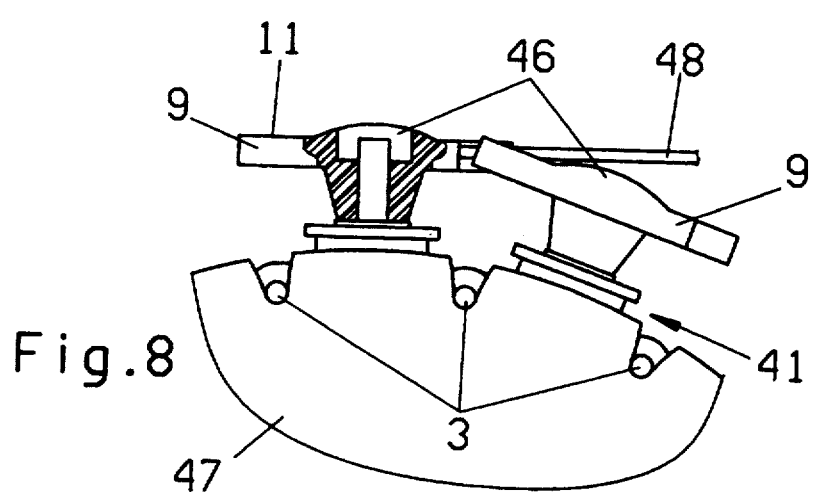
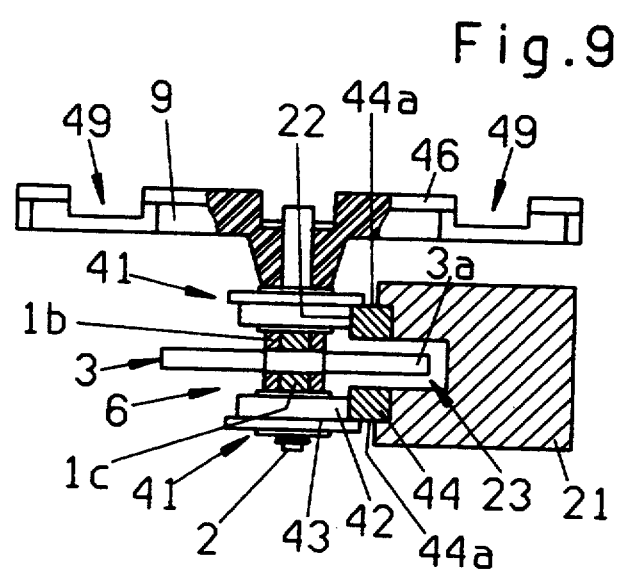

CHAIN CONVEYOR

BACKGROUND OF THE INVENTION

The invention relates to improvements in apparatus for transporting discrete commodities, such as rod-shaped articles of the tobacco processing industry. More particularly, the invention relates to improvements in apparatus for advancing commodities (hereinafter called cigarettes for short) between a maker of cigarettes and a filter tipping machine, between a maker and storage, between a maker and a packing machine, between a filter tipping machine and storage, between a filter tipping machine and a packing machine, between a maker of filter rod sections and a filter tipping machine, between storage and a filter tipping machine, between storage and a packing machine and/or elsewhere in the production lines for the mass production of rod-shaped articles of the tobacco processing industry. Still more particularly, the invention relates to improvements in apparatus wherein the means for advancing articles includes a chain conveyor.

It is already known to advance mass flows of cigarettes on a chain conveyor wherein the links are articulately connected to each other by upright connectors (hereinafter called pins or chain pins) having upper end portions which support substantially plate-like carriers of a mass flow of cigarettes. Reference may be had, for example, to published European patent application No. 0 221 683 B1 of Cerman which discloses a chain having a series of non-identical links and pins or shafts which extend horizontally in parallelism with the cigarettes on the carriers and in parallelism with each other. Such chain can transport cigarettes along a horizontal path or along a path which slopes upwardly and/or downwardly in a single vertical plane. However, the chain cannot advance cigarettes along a meandering path, e.g., along a spiral path upwardly into and downwardly from an upright magazine which is used for temporary storage of plain or filter cigarettes between a maker of cigarettes and storage, between a maker of cigarettes and a filter tipping machine, between a maker of cigarettes and a packing machine, between a filter tipping machine and storage or between storage and a packing machine for filter cigarettes. Magazines wherein mass flows of cigarettes are temporarily stored in the form of spirals having vertical axes are preferred in many cigarette making plants because they require a minimum of floor space. Magazines of such character are disclosed, for example, in commonly owned U.S. patent application Ser. No. 08/157,222. The disclosure of this patent application is incorporated herein by reference.

Published German patent application No. 32 35 224 A1 discloses a chain with links which constitute carriers of conveyed commodities and are articulately connected to each other by universal joints having pairs of pintles which cross one another. One pintle of each pair has a vertical axis and the other pintle of each pair has a horizontal axis. Such joints are complex and expensive. Furthermore, the chain is not provided with rollers, balls or other rotatable followers for engagement with the surfaces of guides which define a path for the chain. The links of the chain are caused to slide along stationary surfaces so that they are subject to extensive wear. Therefore, the chain can be utilized primarily or exclusively for the transport of goods along straight paths which are horizontal or slope upwardly or downwardly in a single vertical plane. For example, the chain cannot be utilized in a magazine of the type disclosed in the aforementioned commonly owned U.S. patent application Ser. No. 08/157,222.

Published German patent application No. 28 22 196 of Band discloses a chain which is intended for the transport of bulky and heavy articles. The chain employs a series of identical links which are connected to each other by alternating vertical and horizontal pins. The end portions of the horizontal pins carry rollers resting on and adapted to roll along horizontal guide surfaces. The upper end portions of the vertical pins support carriers for the articles as well as pairs of rollers which are guided by vertical surfaces. The inventor states that the chain can transport articles in a spiral path extending along an arc of 360°. The combined weight of the transported articles and of the chain is borne exclusively by the guide surfaces for the rollers on the horizontal pins so that such guide surfaces must be machined with a high degree of precision. Moreover, the links of the chain of Band cannot be moved sideways along a single guide surface, i.e., the rollers on the vertical pins must always be guided by pairs of spaced apart vertical surfaces. This excludes the utilization of such chains in magazines of the type disclosed in the commonly owned U.S. patent application Ser. No. 08,157,222.

German Auslegeschrift No. 1 005 453 of Lemaresquier discloses a chain having identical links which are articulately connected to each other by pairs of crossing pins and are made of metallic sheet material. Thus, the chain of Lemaresquier resembles the chain which is disclosed in the aforediscussed published German patent application No. 32 35 224 A1. Rollers which are provided on the horizontally extending pins are caused to advance along stationary rails to establish a path for the chain. Such rollers are provided with protruding hubs receivable in the tooth spaces between the teeth of sprocket wheels at the end turns of the chain. The means for limiting sidewise movements of the chain links includes stubs for additional rollers. The vertically extending pins support carriers for commodities to be advanced along the prescribed path. In order to be movable up or down or along a horizontal path as well as sideways along a concave or convex path, the chain of Lemaresquier must be be supported and guided by a plurality of rails or other tracks providing several vertical and several horizontal or upwardly or downwardly sloping guide surfaces. All this contributes to the initial and maintenance cost as well as to the space requirements of the chain of Lemaresquier.

USSR Inventor's Certificate No. 385426 to Kolombo discloses an open vehicle for the transport of passengers between spaced apart remote boarding and disembarking stations. The vehicle which is disclosed by Kolombo is not intended to advance and is not capable of advancing discrete commodities in the form of mass flows of rod-shaped articles of the tobacco processing industry.

Certain other types of conveyors are disclosed in the published UK patent application No. 2 072 123 B2 and in U.S. Pat. Nos. 3,450,250, 3,575,282, 3,952,860 and 4,664,253. To the extent that they contribute to understanding of the present invention, the disclosures of these U.S. patents and of the UK patent application are incorporated herein by reference.

OBJECTS OF THE INVENTION

An object of the invention is to provide a simple and inexpensive apparatus which employs a chain and can be utilized to transport rod-shaped articles of the tobacco processing industry between spaced apart stations along straight, upwardly sloping, downwardly sloping, helical, meandering and/or other paths.

Another object of the invention is to provide a chain conveyor which can be utilized in or with magazines of the character disclosed in the commonly owned copending patent application Ser. No. 08/157,222.

A further object of the invention is to provide a chain conveyor which is constructed and assembled in such a way that its links and/or other constituents require a minimum of guidance for advancement along concave, convex, horizontal, upwardly sloping and/or downwardly sloping paths.

An additional object of the invention is to provide an apparatus which can be utilized with advantage to transport mass flows of parallel rod-shaped articles of the tobacco processing industry along upwardly and/or downwardly extending spiral paths.

Still another object of the invention is to provide the chain of the improved apparatus with novel and improved carriers for rod-shaped commodities.

A further object of the invention is to provide a set of novel and improved followers for use in the apparatus of the present invention.

Another object of the invention is to provide a highly versatile and articulate chain conveyor which is constructed and assembled in such a way that it can employ a single type of links.

An additional object of the invention is to provide the apparatus with novel and improved means for preventing misorientation and for inducing proper orientation of rod-shaped articles of the tobacco processing industry which are to be transported in the form of a mass flow.

Still another object of the invention is to provide novel and improved guide means for the followers of the above outlined chain conveyor.

A further object of the invention is to provide the above outlined chain conveyor with followers which stabilize the supports for conveyed commodities irrespective of the direction and/or slope of the path for the advancement of mass flows of rod-shaped articles.

Another object of the invention is to provide a magazine for rod-shaped commodities which embodies one or more chain conveyors of the above outlined character.

An additional object of the invention is to provide a chain conveyor wherein the followers do not or need not rest on supporting surfaces or guide surfaces.

Still another object of the invention is to provide a chain conveyor which is constructed and assembled in such a way that its links can be advanced along arcuate paths having small or large radii of curvature.

A further object of the invention is to provide novel and improved carriers for the conveyed commodities.

Another object of the invention is to provide a simple but versatile chain conveyor which can properly support and advance a single layer of rod-shaped articles as well as multiple-layer mass flows of such articles.

An additional object of the invention is to provide an apparatus employing a chain conveyor which can gently support and predictably advance sensitive rod-shaped articles such as mass flows of plain or filter cigarettes or other rod-shaped articles of the tobacco processing industry through short or long distances and along simple and/or complex or highly complex paths.

SUMMARY OF THE INVENTION

The invention is embodied in an apparatus for advancing commodities (such as mass flows of parallel rod-shaped articles of the tobacco processing industry) along at least one guide surface having at least one non-linear portion and being defined by one or more elongated rails or other suitable tracks. The apparatus comprises a mobile chain including a series of identical or different links with each link disposed between a first and a second neighboring link. The chain further comprises first parallel chain pins articulately connecting each of the links with the respective first neighboring link, and second parallel chain pins which are substantially normal to and alternate with the first pins and articulately connect each link with the respective second neighboring link. The second pins have axes which are at least substantially parallel to the at least one guide surface and each second pin includes a portion extending beyond the links which are articulately connected to each other by such second pin. The chain further comprises a platform mounted on the aforementioned portion of each second pin and having a supporting surface which faces away from the adjacent links and extends substantially radially of the axis of the respective second pin. Still further, the chain comprises means for tracking the at least one guide surface, and such tracking means comprises at least one follower provided on each of the second pins and having a surface tracking the at least one guide surface.

In one presently preferred embodiment of the improved apparatus, the axes of the second pins extend substantially vertically and the first pins have substantially horizontal axes. The supporting surfaces of the platforms forming part of such chain are at least substantially horizontal and the at least one guide surface is substantially vertical. The aforementioned portions of the second pins extend upwardly beyond the adjacent links so that the platforms are disposed above the links which are articulately connected to each other by the respective second pins.

The mounting of the platforms can be such that they are turnable about the axes of the respective second pins.

The followers can constitute or resemble rollers which are rotatable about the axes of the respective second pins and the surfaces of such followers can constitute substantially cylindrical surfaces which are coaxial with the respective second pins.

The apparatus further comprises means for moving the chain in a predetermined direction along the at least one guide surface so that the commodities resting on the supporting surfaces of the platforms moving along the at least one guide surface can be transported from a first location (e.g., from a cigarette maker or from a filter tipping machine) to a second location (e.g., into storage, to a filter tipping machine or to a packing machine for arrays of rod-shaped articles of the tobacco processing industry). Each platform of the chain includes a leading portion and a trailing portion, as seen in the direction of advancement of the chain. Each leading portion and each trailing portion is preferably provided with alternating projections (e.g., in the form of teeth) and recesses (e.g., tooth spaces between the teeth) forming a row extending transversely of the direction of movement of the chain. The projections of the leading portion of each platform extend with clearance into the recesses in the trailing portion of a neighboring platform and vice versa so that the supporting surfaces of the platforms together form a composite elongated supporting surface and the platforms can change their orientation relative to the neighboring platforms during movement of the respective second pins along the at least one non-linear portion of the at least one guide surface.

A second surface of each platform can be positioned in such a way that it confronts the adjacent chain links. The platforms together constitute a series of successive platforms, as seen in the direction of movement of the chain, with each platform disposed between two neighboring platforms. Each platform can be provided with a tongue extending substantially in the direction of movement of the chain and into a socket provided for the tongue in the second surface of one of the neighboring platforms, i.e., of the immediately preceding or the immediately following platform.

Each follower can comprise a smaller-diameter first portion which is provided with the respective tracking surface, and a larger-diameter second portion having a surface tracking a second guide surface adjacent and inclined relative to the at least one guide surface. In one of the presently preferred specific embodiments of the improved apparatus, the tracking means comprises two followers provided on each second pin and spaced apart from each other in the direction of the axis of the respective second pin. Each such follower includes a smaller-diameter portion provided with the respective tracking surface and a larger-diameter portion provided with a tracking surface engaging one of two additional guide surfaces which are inclined relative to the at least one guide surface. The at least one guide surface can be disposed between and can be at least substantially normal to the additional guide surfaces.

The chain is or can be an endless chain having a first reach adjacent the at least one guide surface and a return reach. The supporting surfaces of platforms forming part of the first reach preferably face upwardly and are disposed in one of three mutually inclined planes including a substantially horizontal plane, a plane which slopes upwardly, as seen in the direction of advancement of the first reach, and a plane which slopes downwardly, as seen in the direction of advancement of the first reach. The tracking means of such chain can include a pair of followers provided on each second pin and spaced apart from each other in the axial direction of the respective second pin. The at least one guide surface of such apparatus can have a first portion which is tracked by the surface of the at least one follower and a second portion which is tracked by the other follower of the respective pair of followers while the corresponding second pin advances with the first reach of the endless chain.

The supporting surfaces of the platforms can be provided with means for orienting cigarettes or other discrete rod-shaped commodities which rest on the supporting surfaces and are disposed substantially transversely of the direction of movement of the chain. The orienting means can constitute or include protuberances which are provided on the supporting surfaces of the platforms.

The followers on the second pins can contain or consist of a wear-resistant material; for example, the followers can be made of a sintered metallic material.

The first pins of the chain extend transversely of the direction of movement of the links and preferably include end portions extending beyond the links which are articulately connected to each other by such first pins.

The means for moving the chain in a predetermined direction along a path at least a portion of which extends along the at least one guide surface can include a driven sprocket wheel which is adjacent a portion of the path, for example, downstream of the at least one non-linear portion of the at least one guide surface. The sprocket wheel can be provided with an annulus of teeth which alternate with tooth spaces and the tooth spaces are preferably dimensioned in such a way that they can receive the followers on those second pins which advance along the aforementioned portion of the path.

As mentioned above, the at least one non-linear portion of the at least one guide surface can have a convex outline, and such at least one guide surface can include two vertically spaced-apart sections with a channel between the two sections. The chain is or can be an endless chain and the aforementioned portions of the first pin extend into the channel. The means for moving the chain can include means for pulling the chain downstream of the at least one non-linear portion of the at least one guide surface (as seen in the direction of movement of the chain links) so that the followers bear against the at least one non-linear portion of the at least one guide surface during movement of the respective second pins along the at least one non-linear portion.

If the tracking means comprises a pair of axially spaced-apart followers on each second pin, each follower tracks a discrete section of the at least one guide surface, at least during advancement of the followers and their second pins along the at least one non-linear portion of the at least one guide surface. As mentioned above, the aforesaid portions of the first pins extend or can extend into an elongated channel between the two discrete sections of the at least one guide surface. The means for moving the chain along an endless path can comprise a reversible drive having means (such as the aforementioned sprocket wheel) for selectively moving the chain along the endless path in a first direction and in a second direction counter to the first direction.

The at least one guide surface can include first and second parts which are spaced apart from each other in the direction of movement of the chain along the at least one guide surface, and the means for moving the chain along the at least one guide surface in a first direction and in a second direction counter to the first direction can include a sprocket wheel which is disposed between the first and second parts of the at least one guide surface and has an annulus of alternating teeth and tooth spaces, with the tooth spaces dimensioned in such a way that each thereof can receive a follower or a plurality of coaxial followers. Such moving means can further comprise means (e.g., a reversible electric motor) for selectively rotating the sprocket wheel in a clockwise direction or in a counter-clockwise direction. The sprocket wheel is rotatable about an axis which is at least substantially parallel to the axes of the adjacent second pins.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 8 is a fragmentary partly elevational and partly sectional view of a modified apparatus wherein the supporting surfaces of the platforms are provided With means for orienting rod-shaped articles which rest thereon, the illustrated portion of the chain being trained over a pulley at one end turn of the chain; and FIG. 9 is a transverse sectional view similar to that of FIG. 6 but showing a modified chain and modified means for guiding the followers on the second pins of the chain.

DESCRIPTION OF PREFERRED EMBODIMENTS

FIGS. 1 to 7 show certain details of an apparatus which can be utilized to transport commodities along a straight horizontal or upwardly or downwardly sloping path, along a helical or serpentine or other non-linear path, or along a path which includes straight and non-linear portions. The commodities can include or constitute rod-shaped articles of the tobacco processing industry including plain or filter cigarettes, cigars or cigarillos as well as filter rod sections. For example, the apparatus can be utilized with advantage for the transport of rod-shaped commodities, hereinafter called cigarettes for short, along one or more helical paths in a manner as disclosed, for example, in the aforementioned commonly owned U.S. patent application Ser. No. 08/157,222.

Figure 1:
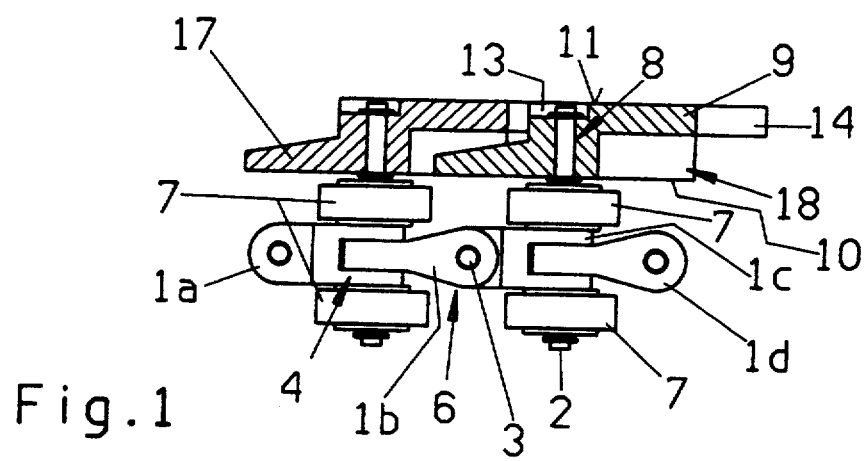
FIG. 1 is a fragmentary partly elevational and partly vertical sectional view of a chain forming part of the improved apparatus, the supporting surfaces of the two illustrated platforms being disposed in a common substantially horizontal plane.
Figure 2:
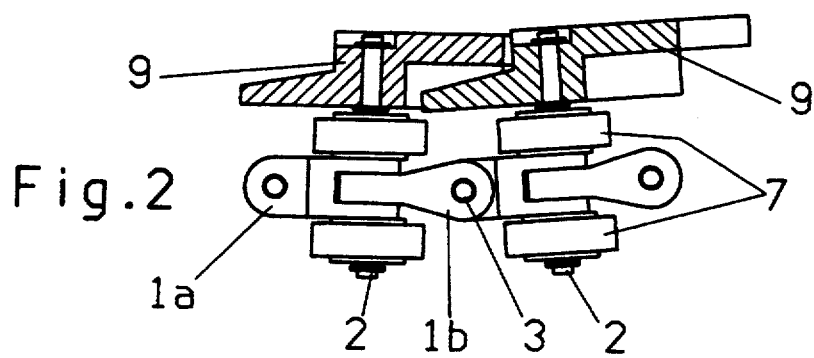
FIG. 2 illustrates the structure of FIG. 1 but with the supporting surface of the right-hand platform sloping downwardly toward the supporting surface of the left-hand platform.
Figure 3:
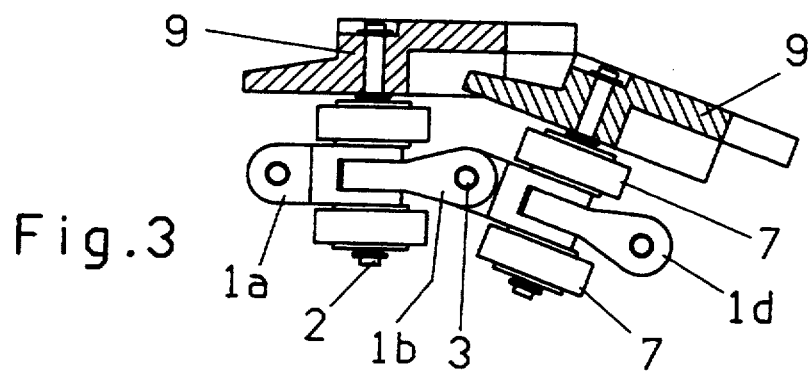
FIG. 3 illustrates the structure of FIG. 1 or 2 but with the supporting surface of the right-hand platform sloping upwardly toward the supporting surface of the left-hand platform.

The apparatus comprises an endless chain including a series of neighboring identical or similar links including the links 1a, 1b, 1c and 1d shown in FIGS. 1 to 3, substantially horizontal chain pins 3 each of which establishes an articulate connection or joint 6 between two neighboring links (such as the links 1b and 1c of FIGS. 1 to 3), and substantially vertical chain pins 2 which alternate with the pins 3 and each of which also establishes an articulate connection or joint 4 between a pair of neighboring links (note the links 1a, 1b and 1c, 1d in FIGS. 1 to 3). All of the pins 2 and 3 extend transversely of the direction of advancement of the chain along its path (note the arrow D in FIG. 5), and the axes of the pins 2 are normal to the axes of the pins 3.

The pins 2 enable the links (e.g., the links 1a, 1b) which are articulately connected to each other by such pins to turn relative to one another about the substantially vertical axes of the respective pins 2. Analogously, the pins 3 enable the respective links (such as the links 1b, 1c) to turn relative to each other about the horizontal or substantially horizontal axes of the respective pins 3. This contributes to pronounced flexibility of the chain employing such links and pins, i.e., the links can be caused to advance along arcuate paths in a horizontal plane or in a plane which is inclined to the horizontal, as well as along helical or meandering paths.

Figure 5:
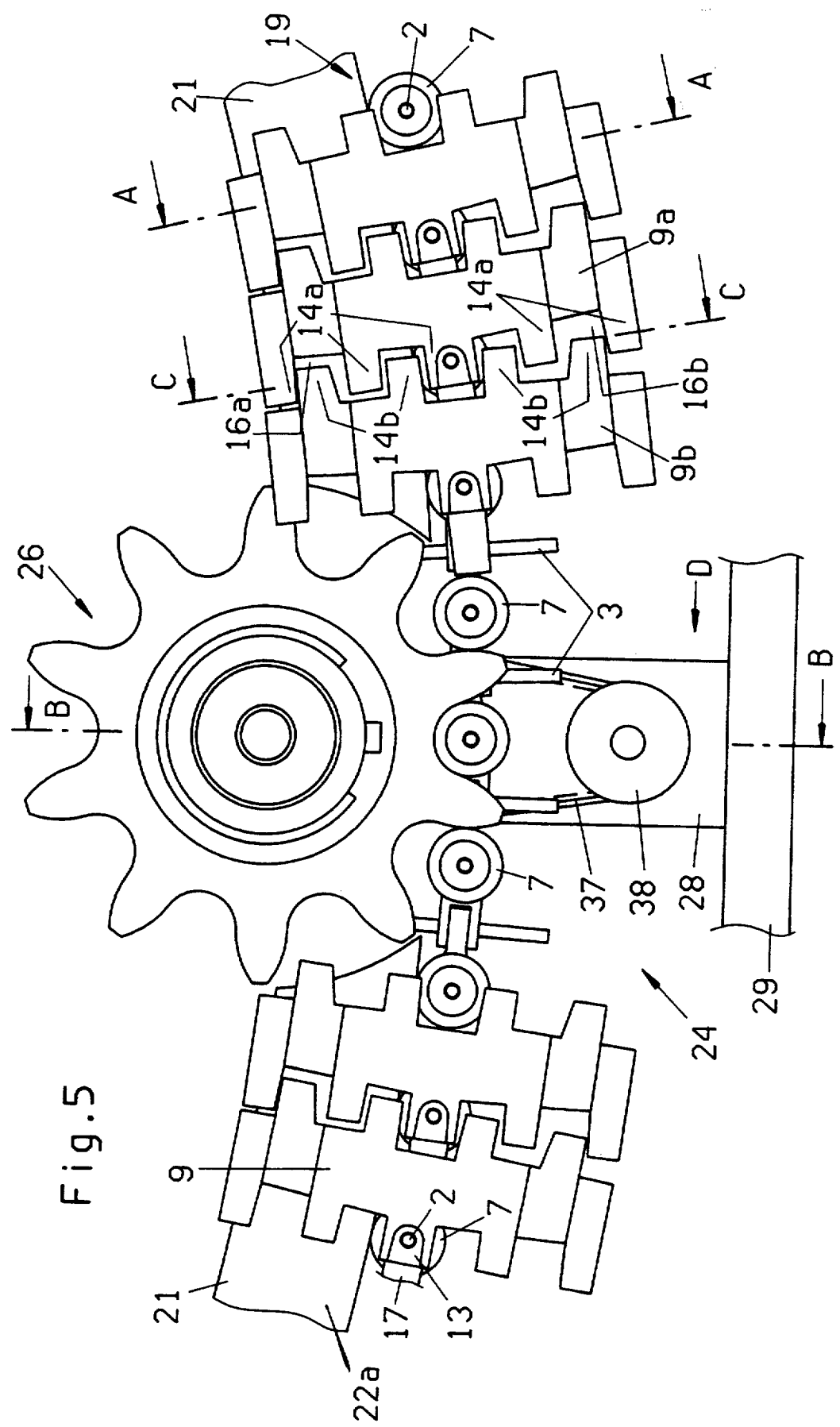
FIG. 5 is a plan view of a portion of a chain embodying the structure of FIGS. 1 to 4, and further showing means for guiding the chain and means for moving the chain along a predetermined path.
Figure 6:
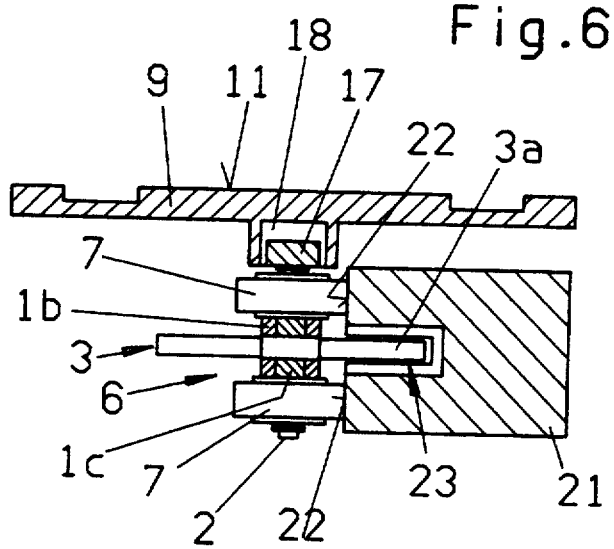
FIG. 6 is a transverse sectional view substantially as seen in the direction of arrows from the line A—A in FIG. 5.

The pins 2 include upper end portions 8 projecting beyond the links which are articulately connected to each other thereby, and the end portions 8 support novel and improved carriers in the form of platforms 9 each having an upper side 11 constituting a supporting surface for cigarettes (not shown) and a second side or surface 10 which confronts the adjacent links. Each platform 9 is turnable about the axis of the respective pin 2, either with or relative to such pin. Furthermore, each pin 2 carries two coaxial followers 7 in the form of rollers or wheels having cylindrical or substantially cylindrical peripheral surfaces in rolling contact with the respective portion 22 of a composite vertical guide surface on an elongated guide or track 21 in the form of a rail (FIGS. 5 and 6). One of each pair of coaxial followers 7 is disposed between the adjacent links (such as the links 1a, 1b in FIG. 1) and the respective platform 9, and the other follower surrounds a lower end portion of the respective pin 2 and is adjacent the underside of the adjacent link (1a or 1c in FIG. 1). The tip of the upper end portion 8 of each pin 2 does not project upwardly beyond the supporting surface 11 of the respective platform 9, and the surface 11 is provided with a depression 13 for a detent in the form of a split washer 12 which extends in part into a circumferential groove of the end portion 8. Similar detents are provided to maintain the followers 7 in requisite axial positions relative to the respective pins 2 (see particularly FIG. 4).

Each supporting surface 11 extends substantially radially of the axis of the respective pin 2. The platforms 9 which are shown in FIGS. 1 to 7 are made of a metallic material. FIGS. 8 and 9 show platforms which are made of a plastic material. It is desirable to make such platforms of a lightweight material. The followers 7 are preferably made of a wear-resistant material, e.g., sintered metal.

The width of the supporting surfaces 11 can match or can be greater or less than the axial length of cigarettes which are carried by and advanced with the platforms 9 in the direction of the arrow D or in the opposite direction. All that counts is to ensure that the surfaces 11 can adequately support the advancing commodities. As already stated before, the chain which is shown in the drawings can be utilized with advantage for the transport of mass flows of cigarettes, i.e., of multiple superimposed layers of cigarettes extending at right angles to the direction of advancement of the upper or first or article supporting reach of the chain.

Figure 4:
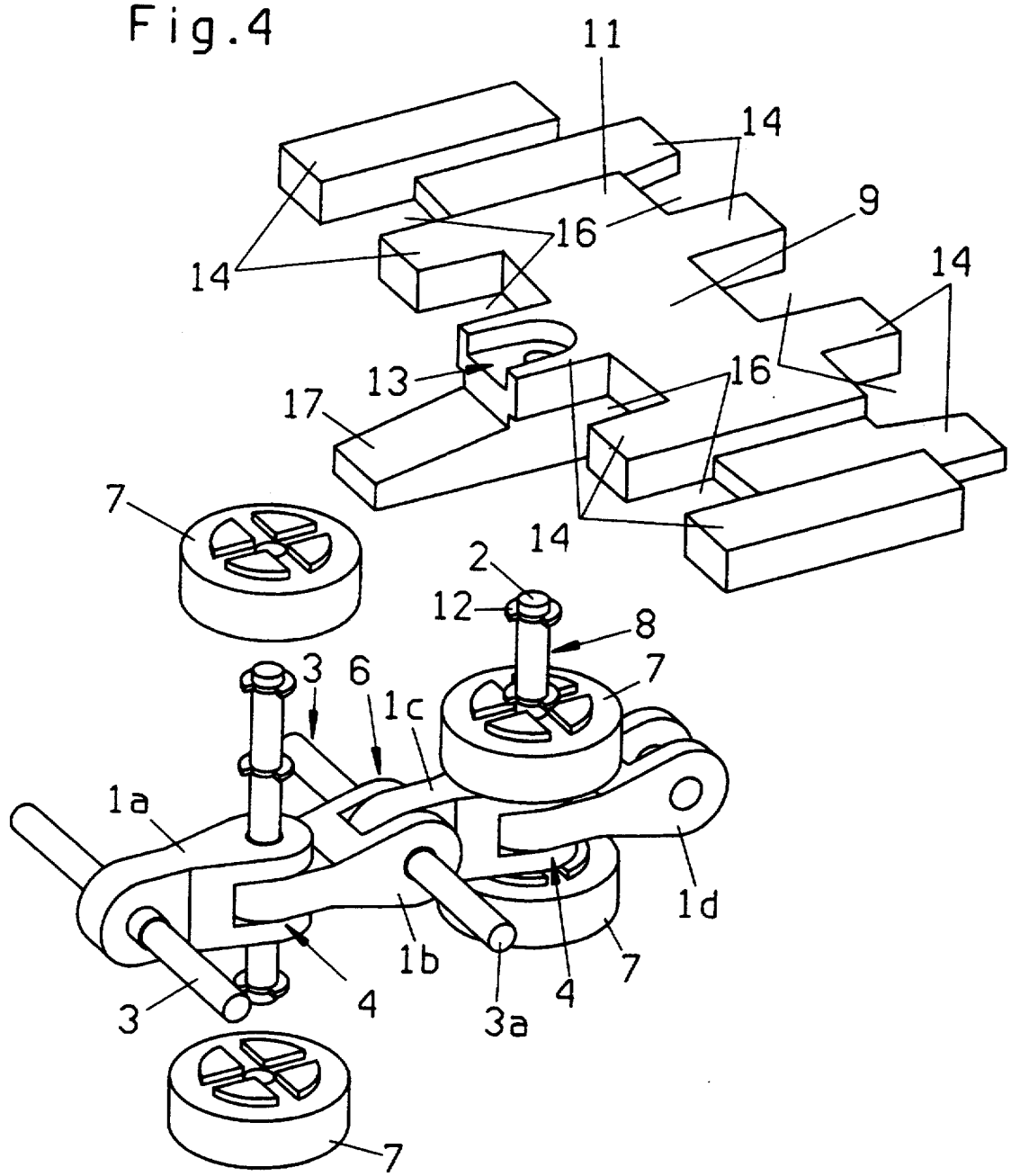
FIG. 4 is an enlarged exploded perspective view of a portion of a chain including the structure of FIGS. 1 to 3.

FIG. 4 shows, drawn to a larger scale, those constituents of the improved chain which are shown in FIGS. 1 to 3 but with one of the platforms 9 omitted. The end portions 3a of the pins 3 extend beyond the respective links (such as the links 1b and 1c in FIG. 4) and at least one of these end portions can serve as a means for preventing tilting of the supporting surfaces 11 to either side of the direction (arrow D) of advancement of the links when the chain conveyor is in use. This can be seen in FIG. 6 which shows that one end portion 3a of the illustrated pin 3 extends into an elongated groove 23 between the portions 22 of the guide surface for the pairs of followers 7 on the pins 2.

The leading and trailing portions of each platform 9 are provided with transversely extending rows of alternating projections 14 and recesses 16. The projections and recesses at the leading portion of each platform 9 are staggered relative to the projections and recesses at the trailing portion of the respective platform. This can be readily seen in FIGS. 4 and 5. This enables the projections 14 at the leading portion of a platform 9 to enter, with requisite clearance (FIG. 5), the recesses 16 in the trailing portion of the immediately preceding platform 9 while the projections 14 of the trailing portion of such preceding platform extend into the recesses 16 in the leading portion of the immediately following platform. Such interdigitation of sucessive platforms 9 ensures that the neighboring portions of supporting surfaces 11 on successive platforms 9 can adequately support the adjacent cigarettes even though the respective followers 7 track non-linear sections (note the convex section 22a shown in FIG. 5) of the respective portions 22 of the guide surface for such followers. In other words, the clearances with which the projections 14 are received in the respective recesses 16 should suffice to enable the neighboring platforms 9 to turn relative to each other about the axes of the respective pins 2 to an extent which is necessary to ensure that the corresponding followers 7 can track convex sections (22a) of the respective portions 22 of the guide surface on the track 21. The projections 14 preferably continue to extend into the respective recesses 16 even when the mutual inclination of the respective platforms 9 reaches a maximum value. This guarantees that cigarettes of the mass flow on the supporting surfaces 11 cannot descend between successive platforms 9 regardless of whether the followers 7 are caused to track straight or non-linear portions of the guide surface on the track 21.

In order to ensure that the projections 14 continue to extend into the respective recesses 16 even if the neighboring supporting surfaces 11 are inclined relative to each other, the leading portion of each platform 9 is provided with a forwardly extending tongue 17 which is received with requisite clearance in a socket 18 machined into or otherwise formed in the surface 10 of the immediately preceding platform 9. This can be seen in FIGS. 1 to 3 and 6. Thus, FIG. 1 shows two coplanar or substantially coplanar supporting surfaces 11. FIG. 2 shows that the right-hand supporting surface 11 slopes downwardly toward the immediately preceding surface 11, and FIG. 3 shows that the right-hand supporting surface 11 slopes upwardly toward the preceding surface 11. Irrespective of such mutual inclination of neighboring supporting surfaces 11 relative to each other, the tongues 17 remain in the adjacent sockets 18 to thus ensure satisfactory orientation of successive platforms 9 even if their supporting surfaces are disposed in different planes during advancement along one or more portions of the path for the improved chain. It is clear that the positions of the tongues 17 and sockets 18 can be reversed, i.e., that the tongues 17 can extend rearwardly of the respective platforms 9 into sockets 18 in the surfaces 10 of the immediately following platforms. The tongues 17 and the sockets 18 constitute a desirable and advantageous but optional feature of the improved chain. For example, such feature is not necessary if the entire article supporting run or stretch of the chain is to transport cigarettes in a horizontal plane or in another plane which is inclined to the horizontal but does not exhibit any hills or valleys. If the platforms 9 are provided with tongues 17 and sockets 18, the dimensions of such tongues and sockets can be selected in such a way that they permit practically unlimited tilting of neighboring links relative to each other about the axes of the respective pins 3. This can be readily seen in FIG. 3 wherein the plane of the supporting surface of the right-hand platform 9 makes a rather large angle with the plane of the supporting surface of the left-hand platform 9 but the tongue projecting forwardly from the right-hand platform continues to extend into the socket of the left-hand platform.

The extent of tiltability of neighboring platforms 9 relative to each other in a manner as shown in FIG. 2 is or can be limited by the leading portions (including the projections 14 and recesses 16) of next-following platforms and the trailing portions of the immediately preceding platforms. In other words, the illustrated platforms 9 limit the reduction of the radius of curvature of that path for the chain links 1 whose center of curvature is located above the platforms 9 which are shown in FIG. 2. The radius of curvature can be reduced by appropriate shaping of the recesses 16 and projections 14 and/or by appropriate shaping of the tongues 17 and sockets 18.

On the other hand, the extent of tiltability of neighboring platforms 9 relative to each other in a manner as shown in FIG. 3 (i.e., so that the links 1 can be advanced along an arcuate path having its center of curvature at a level below FIG. 3) can be selected practically at will. This is of advantage at the end turns of the conveyor chain, i.e., where successive links 1 are caused to travel around sprocket wheels to leave the active or transporting stretch or run and enter the return run or stretch of the chain.

Figure 7:
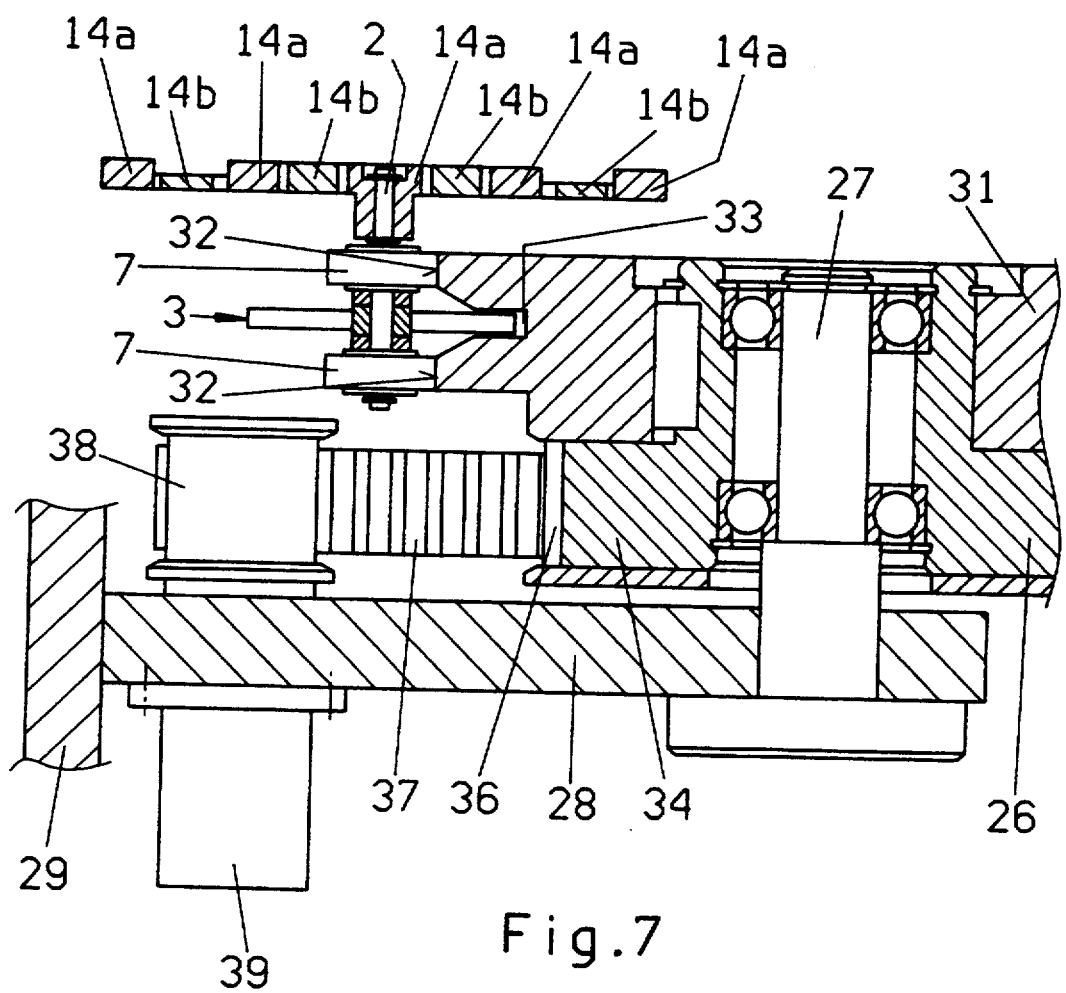
FIG. 7 is a transverse sectional view substantially as seen in the direction of arrows from the line B—B in FIG. 5.

FIGS. 5 and 7 show certain additional components of the apparatus which employs the chain of FIGS. 1 to 4. Some of the platforms 9 are omitted in FIG. 5 in order to expose certain parts of the means for moving the chain along its path and more particularly along an arcuate portion of the path when the followers 7 on successive pins 2 are caused to track the convex sections 22a of the respective portions 22 of the guide surface on the track 21. The path for the followers 7, and hence for the links 1 of the chain, is denoted by the character 19. This path is defined by the portions 22 of the guide surface on the track 21.

FIG. 6 shows that the neighboring platforms 9 of the chain portion shown in FIG. 5 remain interdigitated even though the neighboring platforms must be turned relative to each other about the axes of the respective pins 2. More specifically, FIG. 6 shows that the tongue 17 and the socket 18 of the platforms 9a and 9b shown in the right-hand portion of FIG. 5 continue to cooperate and establish a practically uninterrupted composite supporting surface for the mass flow of cigarettes. The cylindrical peripheral surfaces of the followers 7 roll along the respective portions 22 of the guide surface on the track 21 when the right-hand portion of the chain (including the platforms 9a and 9b) is pulled by the teeth of a sprocket wheel 26. To this end, the tooth spaces which alternate with the teeth of the sprocket wheel 26 are dimensioned to receive the pairs of followers 7 on successive pins 2 (see FIG. 7) to thus ensure predictable advancement of the chain along its path 19. If the axis of the shaft 27 for the sprocket wheel 26 of FIGS. 5 and 7 is vertical, the teeth of the sprocket wheel ensure that the followers 7 advancing toward the sprocket wheel are urged against the convex sections 22a of the respective portions 22 of the guide surface on the track 21. This, in turn, ensures that the axes of the pins 2 are vertical and that the supporting surfaces 11 of the platforms 9 advancing toward and along the sprocket wheel are maintained in a common horizontal plane. FIG. 5 further shows that the sprocket wheel 26 cooperates with the track 21 to ensure that the followers 7 on successive pins 2 remain in rolling contact with the convex sections 22a of the vertical portions 22 of the guide surface on the track even though the followers 7 track the respective portions 22 of a single guide surface. In other words, it is not necessary to provide a further track at the left-hand sides of the followers 7 which are shown in FIG. 6. This is due to the fact that the teeth of the sprocket wheel 26 exert a pull which ensures that the followers 7 approaching the sprocket wheel in the direction of arrow D are compelled to track the convex sections 22a of the guide surface. The sprocket wheel 26 is installed in a gap between the right-hand and the left-hand parts of the track 21 shown in FIG. 5.

As already mentioned before, FIG. 6 further shows a channel or groove 23 which is provided in the guide surface of the track 21 between the vertically spaced apart portions 22 of such guide surface. One end portion 3a of the pin 3 which connects the links 1b and 1c to each other to form a joint 6 extends into the channel 23 to thus limit the extent to which the orientation of the pin 3 can be changed relative to the guide surface of the track 21.

If the improved apparatus is used in a magazine of the type disclosed in the commonly owned copending patent application Ser. No. 08/157,222, the track 21 is designed to define a helical path for the transport of a mass flow of cigarettes into storage or from storage. The aforementioned copending patent application discloses a magazine having a first spiral conveyor which delivers a mass flow of cigarettes into storage, a second spiral conveyor which serves to withdraw a mass flow of cigarettes from storage, and one or more substantially S-shaped bridges which can transfer cigarettes between the first and second spiral conveyors. Pulleys or sheaves of the type shown at 47 in FIG. 8 of the present application can be employed to deflect successive links of the active or first reach of an endless chain into the path for the return reach. The tooth spaces between the teeth of the pulley or sheave 47 of FIG. 8 are dimensioned to receive the end portions of pins 3, i.e., the mutual spacing of the tooth spaces on the member 47 of FIG. 8 is the same as that of successive pins 3 in the conveyor of the present invention.

The chain which is shown in FIG. 5 can be caused to move along a further convex portion of its path 19 by providing a second sprocket wheel downstream of the sprocket wheel 26 and by causing successive pairs of coaxial followers 7 to advance along the convex sections of additional portions of a guide surface of a second track which is installed in the frame of the improved apparatus opposite the track 21 downstream of the sprocket wheel 26. This results in the entry of other end portions of the pins 3 (note the left-hand end portion of the pin 3 shown in FIG. 6) into the channel (corresponding to the channel 23) of the other (non-illustrated) track for the followers 7 on successive pins 2. The pulley or sheave 47 of FIG. 8 can also serve as a constituent of the means for moving the improved chain along a path having one or more non-linear (e.g., convex) portions.

The sprocket wheel 26 of FIGS. 5 and 7 forms part of a unit 24 which serves to move the conveyor including the links 1 and pins 2, 3 along its prescribed path 19. As already mentioned before, FIG. 7 is a sectional view substantially as seen in the direction of arrows from the line B—B in FIG. 5. However, the platforms 9a, 9b of FIG. 7 are shown in a sectional view as seen in the direction of arrows from the line C—C in FIG. 5.

The shaft 27 for the sprocket wheel 26 is mounted in and extends upwardly from an arm 28 which is carried by a column 29 forming part of the improved apparatus. The manner of mounting the shaft 27 on the arm 28 of the column 29 is similar to that described in the copending patent application Ser. No. 08/157,222.

The sprocket wheel 26 comprises a gear 31 which is provided with the aforementioned annulus of alternating teeth and tooth spaces as well as with a circumferentially extending groove 33 for the adjacent end portions 3a of successive pins 3. This ensures that the axes of the pins 2 advancing past the gear 31 of the sprocket wheel 26 remain parallel to the axis of the shaft 27. The gear 31 is carried by a hub 34 of the spur gear 26. The hub 34 has an annulus of peripheral axially parallel teeth 36 which mate with the internal teeth of a toothed belt 37 trained over an externally toothed sheave 38 driven by a reversible electric motor 39 or another suitable prime mover. This enables the chain including the links 1 to advance a mass flow of cigarettes in or counter to the direction which is indicated by the arrow D.

The upper portion of FIG. 7 shows the manner in which the projections 14a of the platform 9a shown in the right-hand portion of FIG. 5 alternate with the mating projections 14b of the adjacent platform 9b. The projections 14a and 14b are shown in section as seen in the direction of arrows from the line C—C in FIG. 5.

An important advantage of the improved chain is that it can employ identical links 1 as well as that it can readily follow a straight horizontal or upwardly or downwardly sloping path or a meandering or spiral path. It is no longer necessary to employ specially designed links which carry the platforms having supporting surfaces for the mass flow of cigarettes and specially designed additional links between the links which carry the platforms. This contributes to the simplicity and lower cost of the chain without affecting its versatility and without reducing its useful life. Rotary followers 7 are preferred at this time because they entail a reduction of wear upon the guide surface or surfaces of the track or tracks and generate a minimum of noise. Furthermore, such rotary followers are particularly desirable and advantageous when they are to follow and bear against relatively long or very long convex portions of a guide surface.

Another advantage of the apparatus which employs one or more chains of the type shown in FIGS. 1 to 7 is that the pins 3 need not carry any followers. All these pins have to do is to establish articulate connections or joints 6 between neighboring links 1 and to prevent sidewise tilting of the platforms 9 and their supporting surfaces 11 with reference to the direction of movement of the links. This is accomplished by the provision of the channels or grooves 23 and 33. The absence of need for any followers on the pins 3 contributes to lower cost and simplicity of the chain.

The length of the improved chain can be selected practically at will, e.g., to be useful in magazines of the type disclosed in the copending patent application Ser. No. 08/157,222. If the chain is relatively long, it can be advanced by two or more suitably spaced apart driven sprockets, e.g., sprockets of the type shown at 26 in FIGS. 5 and 7.

As a rule, the end portions of the pins 3 will extend into the channels or grooves 23 and 33 with a certain amount of play, i.e., the end portions of the pins 3 and the channels or grooves 23, 33 can be dimensioned in such a way that they prevent excessive tilting of the normally vertically extending pins 2 which carry the followers 7 and the platforms 9 but that the pins 3 need not rub against the surfaces bounding the channels or grooves 23 and/or 33 when the inclination of the pins 2 is satisfactory. The inclination and orientation of the supporting surfaces 11 of the platforms 9 forming part of the improved chain are sufficiently predictable to ensure proper advancement of a mass flow of cigarettes which extend transversely of the direction of advancement of the chain links as well as proper advancement of a single layer of cigarettes or a single row of spaced-apart discrete cigarettes. This contributes to the versatility of the improved apparatus and its chain. The apparatus can be put to use in existing production lines for cigarettes or analogous articles.

When the prime mover 39 or another suitable prime mover is on to rotate the sprocket wheel 26 in a clockwise or counterclockwise direction, successive tooth spaces of the gear 31 forming part of the sprocket wheel 26 receive successive pairs of coaxial followers 7 in such a way that, when the followers 7 are fully received in a tooth space, they abut the radially innermost portions of the surface 32 (FIG. 7) bounding the respective tooth space. This ensures accurate and predictable guidance of successive chain links 1 during advancement along the gap for the sprocket wheel 26 between the spaced apart parts of the track 21. Portions of successive pins 3 extend into the channel or groove 33 of the gear 31 forming part of the sprocket wheel 26 to maintain the supporting surfaces 11 of successive platforms 9 (FIG. 7 shows the platforms numbered 9a and 9b) at a desired level if and when the pins 2 and their followers tend to move up or down along the vertically spaced apart portions 22 of the guide surface on the track 21, i.e., if and when the followers 7 tend to move up or down relative to the surfaces 32 in the tooth spaces between the teeth of the gear 31.

Though a presently preferred use of the improved chain is in the tobacco processing industries, such chain can be utilized with similar or equal advantage for the transport of tampons or other rod-shaped commodities.

FIGS. 8 and 9 illustrate that the simple cylindrical roller-shaped followers 7 can be replaced with followers 41 each of which includes a smaller-diameter cylindrical portion 42 and a larger-diameter cylindrical or circular disc-shaped portion 43 adjacent the portion 42. The peripheral surfaces of the portions 42 track the vertically spaced-apart portions 22 of a composite vertical guide surface provided on two longitudinally extending inserts 44 partially embedded in the adjacent side of the track 21. The inserts 44 are disposed above and below the channel or groove 23 for the adjacent end portions 3a of successive horizontal pins 3. The inner side faces of the disc-shaped (larger-diameter) portions 43 of the followers 41 engage the adjacent guide surfaces 44a of the respective inserts 44. Such guidance of the followers 41 along mutually inclined guide surfaces (22 and 44a) enables the pins 2 to bear the entire weight of the chain and of the commodities thereon as well as to remain in vertical positions and to follow the outlines of non-linear (such as convex) portions of their path.

The supporting surfaces 11 of the platforms 9 can be provided with suitable means for orienting cigarettes which are being transported above and along a track 21. FIGS. 8 and 9 show orienting means in the form of protuberances 46 (e.g. ribs) extending transversely of the surface 11 of the illustrated platform 9. The protuberances 46 can alter the orientation of misaligned cigarettes and/or maintain properly aligned cigarettes against a change of orientation. The provision of means for orienting cigarettes on the supporting surfaces 11 of the platforms 9 is particularly important and desirable if the mass flow of cigarettes on the composite supporting surface including the surfaces 11 of successive platforms 9 is to be advanced along one or more arcuate portions of the path for the chain, e.g., around sprocket wheels (26) or pulleys or sheaves (47).

The pulley or sheave 47 of FIG. 8 is mounted for rotation about a horizontal axis, e.g., at an end turn of an endless chain utilizing the links 1, the pins 2, 3, the followers 7 or 41, and platforms 9. The tooth spaces at the periphery of the member 47 receive portions of successive horizontal pins 3 to thus ensure predictable advancement of successive platforms along an arcuate path, e.g., from the article-supporting stretch or run of the endless chain toward the return stretch or run or vice versa.

FIG. 8 further shows the manner of removing successive increments of a mass flow of cigarettes from the supporting surfaces 11 of successive platforms 9 advancing along the pulley or sheave 47. The supporting surfaces 11 of the platforms 9 are provided with elongated channels or grooves 49 (see particularly FIG. 9) which extend in the direction of advancement of successive platforms 9 (namely in a clockwise direction, as viewed in FIG. 8). The grooves 49 are in line with fixed fingers 48 which divert successive increments of the mass flow from the respective supporting surfaces onto a belt conveyor or into a magazine (not shown) or directly into a processing machine.

As mentioned above, the surfaces bounding the groove or channel 23 in the track 21 or the channel or groove 33 of the sprocket wheel 26 can actually cooperate with the end portions 3a of the horizontal pins 3 to prevent the platforms 9 and their supporting surfaces 11 from migrating up or down from a desired level. Alternatively, a channel or groove 23 and/or 33 can merely serve as a passage for the adjacent end portions 3a of successive pins 3. This will be readily appreciated by referring again to FIG. 9 which shows that the platform 9 shown therein is maintained at a desired level by the larger-diameter portions 43 of the followers 41 because the portions 43 engage the adjacent guide surfaces 44a of the respective inserts 44 so that the end portion 3a of the pin 3 shown in FIG. 9 does not contact the adjacent portions of the surface bounding the channel or groove 23 in the track 21. The end portions 3a of the pins 3 then serve only as a means for cooperating with a pulley or sheave (47 in FIG. 8) to advance successive platforms 9 along an arcuate path, for example, at the article discharging end turn of the active or acticle carrying run or stretch of the chain, so that the fingers 48 can enter the oncoming grooves 49 in order to strip successive increments of the mass flow of cigarettes off the adjacent supporting surfaces 11. The platforms 9 of links forming part of a chain which employs followers 41 of the type shown in FIGS. 8 and 9 will remain at a predetermined level as long as the chain is under tension, namely as long as the followers 41 are sufficiently close to the track 21 to ensure that the larger-diameter portion 43 of the upper follower 41 of FIG. 9 will overlie the guide surface 44a of the upper insert 44 and that the surface 44a of the lower insert 44 of FIG. 9 will at least partially overlie the adjacent side of the larger-diameter portion 43 of the lower follower 41.

An advantage of the followers 41 is that they enable the respective pins 2 to carry the entire weight of the chain as well as the weight of the mass flow on the supporting surfaces 11 of their platforms 9 because the portions 42, 43 of each follower 41 cooperate to hold the respective pin 2 at a desired level as well as to cause the track 21 and its inserts 44 to bear the weight of the moving chain and of the mass flow thereon with a minimum of friction between the followers 41 and the inserts 44.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for advancing commodities along at least one elongated first guide surface having at least one non-linear portion, comprising a mobile chain including a series of links with each link disposed between a first and a second neighboring link; first pins articulately connecting each of said links with the respective first neighboring link; second pins substantially normal to and alternating with said first pins and articulately connecting each of said links with the respective second neighboring link, each of said second pins having an axis and including a portion extending beyond the links which are articulately connected to each other thereby; a platform mounted on said portion of each of said second pins and having a supporting surface facing away from the links and extending substantially radially of the axis of the respective second pin; and at least one follower provided on each of said second pins, each of said followers including a smaller-diameter first portion having a first circular surface arranged to track said at least one first guide surface and a larger-diameter second portion having a second circular surface arranged to track a second guide surface adjacent and inclined relative to said at least one first guide surface, said first and second circular surfaces cooperating with the respective guide surfaces to prevent movements of said platforms relative to said guide surfaces in at least one direction of the axes of the respective second pins.

2. The apparatus of claim 1, wherein the axes of said second pins are substantially vertical and said first pins have substantially horizontal axes, said supporting surfaces being substantially horizontal and the at least one first guide surface being substantially vertical, said portions of said second pins extending upwardly beyond the links which are articulately connected to each other by the respective second pins so that each of said platforms is disposed above the links which are articulately connected to each other by the respective second pin.

3. The apparatus of claim 1, wherein said platforms are turnable relative to each other and relative to the adjacent links about the axes of the respective second pins.

4. The apparatus of claim 1, wherein said first surfaces of said followers are substantially cylindrical surfaces coaxial with the respective second pins.

5. The apparatus of claim 1 for advancing commodities along the at least one first guide surface in a predetermined direction, wherein each of said platforms includes a leading portion and a trailing portion as considered in said direction, each of said leading and trailing portions having alternating projections and recesses forming a row extending transversely of said direction and the projections of the leading portion of each of said platforms extending with clearance into the recesses of the trailing portion of a neighboring platform and vice versa so that the supporting surfaces of said platforms together form a composite elongated supporting surface.

6. The apparatus of claim 1 for advancing commodities in a predetermined direction, wherein each of said platforms further comprises a second surface confronting the adjacent links and said platforms together constitute a series of successive platforms, as seen in said direction, with each platform disposed between two neighboring platforms, each of said platforms having a tongue extending substantially in said direction and into a socket provided therefor in the second surface of one of the respective neighboring platforms.

7. The apparatus of claim 1, further comprising a second follower provided on each second pin and including a smaller diameter portion provided with a first circular surface arranged to track said at least one first guide surface and a larger-diameter portion provided with a second circular surface arranged to track a third guide surface inclined relative to the at least one first guide surface, said first and second circular surfaces of said second followers cooperating with said first and third guide surfaces to prevent movements of said platforms in the other direction of the axes of the respective second pins.

8. The apparatus of claim 7, wherein the at least one first guide surface is disposed between and is at least substantially normal to the second and third guide surfaces.

9. The apparatus of claim 1 for advancing commodities in a predetermined direction, wherein the chain is an endless chain having a first reach and a return reach, the supporting surfaces of platforms at said first reach facing upwardly and being disposed in one of three planes including a horizontal plane, a plane sloping upwardly as seen in said direction, and a plane sloping downwardly as seen in said direction, and further comprising a second follower provided on each of said second pins and spaced apart from the respective at least one follower in the direction of the axis of the respective second pin, the at least one first guide surface having a first portion tracked by the first circular surface of the at least one follower and a second portion tracked by a circular surface of the second follower on the respective second pin while the second pin is being advanced with said first reach of the endless chain.

10. The apparatus of claim 1 for advancing rod-shaped commodities in a predetermined direction, wherein the supporting surfaces of said platforms have means for orienting discrete rod-shaped commodities resting on said supporting surfaces and being disposed substantially transversely of said direction.

11. The apparatus of claim 10, wherein said orienting means comprises protuberances provided on said supporting surfaces.

12. The apparatus of claim 1, wherein said followers contain a wear-resistant material.

13. The apparatus of claim 12, wherein said material is a sintered material.

14. The apparatus of claim 1 for advancing commodities in a predetermined direction, wherein said first pins extend substantially transversely of said direction and have end portions extending beyond the links which are articulately connected to each other thereby.

15. The apparatus of claim 1, further comprising means for moving the chain in a predetermined direction along a predetermined path, including a driven sprocket wheel adjacent a portion of said path and having an annulus of alternating-teeth and tooth spaces arranged to receive the at least one follower on each second pin advancing along said portion of said path.

16. The apparatus of claim 1 for advancing commodities in a predetermined direction along a predetermined path adjacent said at least one first guide surface, said at least one non-linear portion of said at least one first guide surface having a convex outline and said at least one first guide surface including two vertically spaced-apart sections with a channel between said sections, said chain constituting an endless chain and said first pins having portions extending into said channel, and further comprising means for pulling the chain downstream of said at least one non-linear portion of said at least one first guide surface, as seen in said direction, so that the first circular surface of the at least one follower on each second pin bears against said at least one non-linear portion during movement of the second pin along said at least one non-linear portion.

17. The apparatus of claim 1, wherein said chain is an endless chain and said at least one first guide surface is substantially vertical and includes two vertically spaced apart sections flanking an elongated channel, said at least one non-linear portion of said at least one first guide surface having a convex outline and further comprising a second follower provided on each of said second pins, each second follower having a smaller-diameter first portion having a first circular surface and a larger-diameter second portion having a second circular surface, the followers on each of said second pins being spaced apart from each other in the axial direction of the respective second pin and the first circular surfaces of the followers on each of said second pins tracking different sections of said at least one first guide surface at least during advancement of the respective second pins along said at least one non-linear portion of the at least one first guide surface, each of said first pins having a portion extending into said channel and further comprising means for moving the chain along an endless path, said moving means comprising a reversible drive having means for selectively moving the chain along said path in a first direction and in a second direction counter to said first direction.

18. The apparatus of claim 1, wherein the at least one first guide surface includes spaced-apart first and second parts and further comprising reversible means for moving the chain along the at least one first guide surface in a first direction and in a second direction counter to said first direction, said moving means including a sprocket wheel disposed between said parts of the at least one first guide surface and having an annulus of alternating teeth and tooth spaces for said followers, and means for selectively rotating said sprocket wheel in clockwise and counterclockwise directions.

19. The apparatus of claim 18, wherein said sprocket wheel is rotatable about an axis which is at least substantially parallel to the axes of said second pins.

20. A chain comprising a series of links with each link disposed between a first and a second neighboring link; first pins articulately connecting each of said links with the respective first neighboring link; second pins substantially normal to and alternating with said first pins and articulately connecting each of said links with the respective second neighboring link, each of said second pins having an axis and including a portion extending beyond the links which are articulately connected to each other thereby; a platform mounted on said portion of each of said second pins and having a supporting surface facing away from the links and extending substantially radially of the axis of the respective second pin; and at least one follower provided on each of said second pins, each of said followers having a substantially cylindrical surface coaxial with the respective second pin and having a first diameter and each of said followers further having an annular surface having an outer diameter larger than said first diameter, said annular surfaces being disposed in planes at least substantially normal to the axes of the respective second pins.

* * * * *